Nov. 22, 1960   J. AUER, JR., ET AL   2,960,968
HIGH CAPACITY FLUID BRAKE
Filed March 18, 1960   2 Sheets-Sheet 1
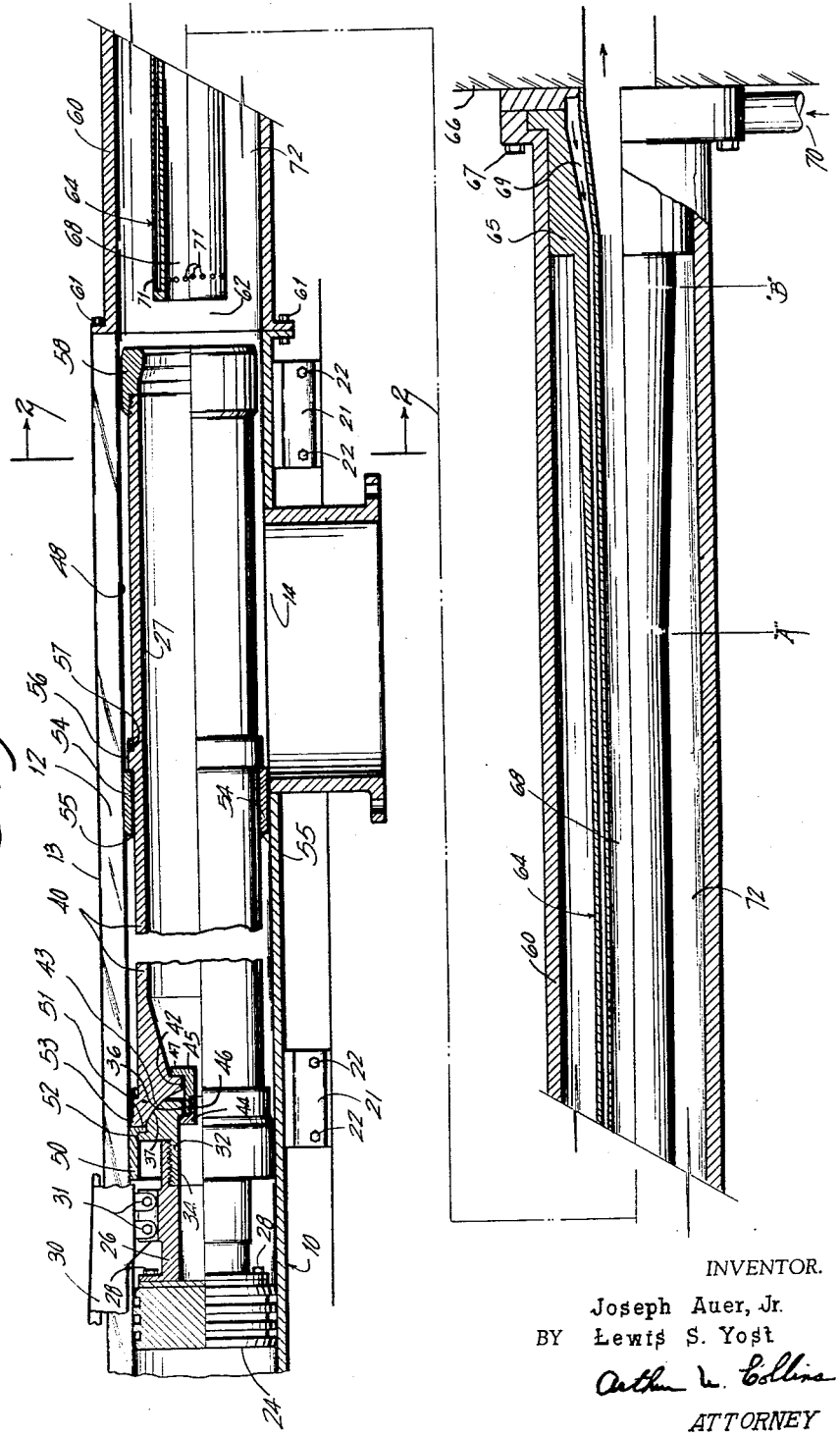
INVENTOR.
Joseph Auer, Jr.
BY Lewis S. Yost
Arthur L. Collins
ATTORNEY Nov. 22, 1960     J. AUER, JR., ET AL     2,960,968
HIGH CAPACITY FLUID BRAKE INVENTOR.
Joseph Auer, Jr
BY Lewis S. Yost Arthur M. Collins
ATTORNEY 2,960,968
Patented Nov. 22, 1960

2,960,968
HIGH CAPACITY FLUID BRAKE

Joseph Auer, Jr., and Lewis S. Yost, Philadelphia, Pa., assignors to the United States of America as represented by the Secretary of the Navy Filed Mar. 18, 1960, Ser. No. 16,110

4 Claims. (Cl. 121—38)

(Granted under Title 35, U.S. Code (1952), sec. 266)

The invention described herein may be manufactured and used by or for the Government of the United States of America for governmental purposes without the payment of any royalties thereon or therefor.

This invention relates to energy dissipators and particularly a water brake for halting an aircraft launching shuttle.

The usual aircraft launcher or catapult has an engine comprising a horizontally disposed, longitudinally slitted cylinder in which a piston is steam driven. Power from the piston is applied to the aircraft by a shuttle to which it is connected and which in turn is joined to the piston by an arm extending through the slot in the cylinder.

A brake cylinder filled with water is coupled to the forward end of the power cylinder as an extension of it and a tapered spear is secured rigidly to the forward end of the piston. The forward motion of the piston at the end of its run drives the spear into the water filled brake cylinder. The displacement of the water by the spear, which has little space for escape between the spear and the brake cylinder builds up the water pressure sufficiently to bring the spear, the piston and shuttle thereby, to a halt.

Cut-outs are provided in the forward end of the power cylinder for the escape of displaced water; but cylinder structure limits their size, which is ordinarily too small for the amount of water ejected under the tremendous pressures developed. Consequently, a considerable amount of water reaches the aft portions of the power cylinder and cools them; catapult efficiency and power at times is thereby lowered to dangerous levels.

The length of the spear is a large factor in determining the brake's capacity. This is also limited in devices previously described, since with overly long spears the cantilevered construction and the speed of piston travel tends to cause it to tip the power cylinder, create vibrations and collide with other parts of the brake. The spear length is held to practical limits, as a consequence; but the brake is incapable of safely arresting a shuttle and piston assembly under runaway conditions.

In view of the above, it is an object of this invention to provide a new and improved fluid displacement type brake which avoids the objections given above and has the capacity to arrest a runaway shuttle and piston.

It is another object of this invention to provide a water brake for an aircraft catapult in which the possibility of displaced water entering the power cylinder is greatly reduced.

It is a further object of this invention to provide a catapult water brake in which a relatively small amount of water is required within the brake cylinder and energy adsorption capacity thereof may be increased without substantial increase in weight.

It is also an object of this invention to provide a catapult water brake in which a hollow spear is fixed within the brake cylinder and a sleeve, supported by shoes riding on the cylinder wall, is articulately joined to the power piston so that forward movement of the power piston will drive the sleeve into the brake cylinder. Water displaced thereby is ejected forwardly through the spear, the construction permitting the development of high braking forces.

Other objects, novel features and advantages of the invention will become apparent from the following description and accompanying drawings, wherein:

Fig. 1 is a sectional side elevation view illustrating the invention as applied to an aircraft steam catapult;

Figure 3:
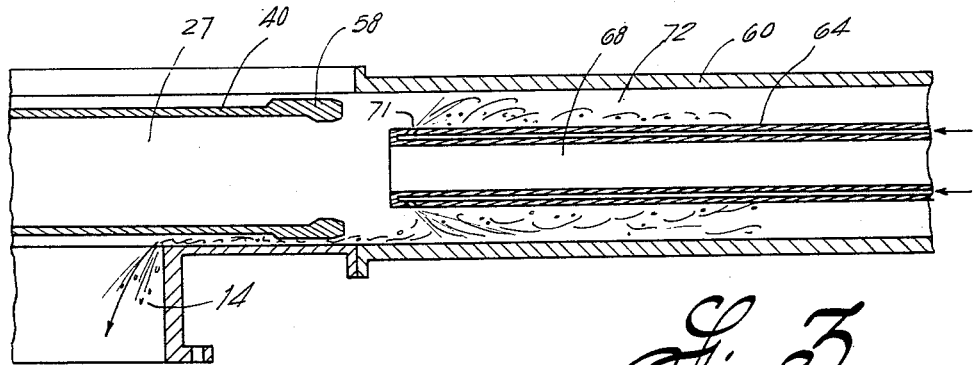
Fig. 3 is a schematic view showing the brake cylinder filled with water preceding a braking operation.

Referring to the drawing, 10 represents the forward portion of a steam catapult power cylinder having a longitudinal slit 12 defined by upstanding flanges 13. The cylinder is ordinarily disposed horizontally beneath an aircraft take-off surface such as a ship's deck, not shown; its base rests in U-like elements 16 to which it is secured by means such as welds 18. The elements 16 are supported on pads 20 and fastened to them by a C clamp 21 and bolts 22 which permits some longitudinal movement of the cylinder due to expansion and contraction.

Cut-outs, as shown at 14, are provided in the bottom of cylinder 10 near its forward end for by-passing water ejected from the brake. In the past, where reliance has been solely on such passages to by-pass all water leaving the brake, they have proven to be inadequate.

A piston 24 is disposed in cylinder 10 for movement under expansive force of steam applied at its aft end. As depicted in the drawings, the piston moves under power from left to right. A tubular barrel 26, of smaller diameter, is secured by bolts 28 to the forward end of piston 24 and an arm 30, connected to the barrel by bolts 31, projects upwardly from the barrel through cylinder slot 12. The arm is adapted to be coupled with a shuttle, not shown, by which the force of piston 24 may be transmitted to an aircraft to be catapulted.

The braking mechanism by which piston 24, and the shuttle thereby, is halted at the end of its power run, includes, in a broad way, a male braking member or sleeve 40 connected to piston 24 through an adapter 32, a water filled brake cylinder 60 and a spear 64 concentrically mounted within the brake cylinder.

In detail, adapter 32 is a tubular element which is secured at its aft end to barrel 26 by means such as threads 34; its forward end is curved inwardly to form an inner flange 36 having an outer ball-like, convex surface 37. Brake sleeve 40 is also tubular; it has a bore 27 and is provided with a similar inwardly directed flange 42 at its forward end which has a concave, socket-like, surface 43 adapted to seat on convex adapter surface 37 to form a ball and socket joint. Barrel 32 is coupled to brake sleeve 40 by nuts 44 and 45 disposed therein and threaded together by threads 46. This is achieved by an outwardly directed flange 47 on each of the nuts 44 and 45 which together clamp flanges 36 and 42 of the barrel and sleeve, respectively.

Support for sleeve 40 is provided by means of shoes 50 and 54 designed to slide on the inner surface 48 of power cylinder 10. Shoe 50 is of the sleeve type that is provided with an inner flange 51 and held thereby between outer flanges 52 and 53 extending from adapter 32 and brake sleeve 40, respectively; whereas, shoes 54 are blocks held by welds 55 or other means to the outer surface of sleeve 40 at various necessary points. Obviously the outer surfaces of shoes 50 and 54 are compatible with the inner surface of power cylinder 10 for sliding movement thereon. From the description given, it is apparent that the articulate connection between sleeve 40 and adapter 32 and the support provided by shoes 50 and 54 will practically eliminate the transfer of vibrations between piston 24 and brake sleeve 40 and the tendency of the brake sleeve 40 to tip piston 24.

Conveniently spaced around the outer surface of brake sleeve 40 are a number of rings or brackets 56 having an outer diameter slightly less than the inner diameter of cylinder 10 and a concave forward end surface 57. A choke ring 58 having an outer diameter substantially equal to that of the brackets 56 is secured to the end of sleeve 40 as an extension of it. The brackets and choke ring deflect water ejected in braking from entering the power cylinder.

Water brake cylinder 60 is installed at the forward end of power cylinder 10 and secured thereto by flange bolts 61 or other suitable means. The bore 62 of brake cylinder 60, as viewed in cross-section and in a forward direction, is of the same diameter as that of power cylinder 10 for over half its distance, as to line A; it then tapers slightly for about a quarter of the brake cylinder length to a line B where it is of about the same diameter as the outer diameter of choke ring 58. This diameter is maintained for the rest of the length of the brake cylinder.

Concentrically disposed within brake cylinder 60 is a spear 64 integrally joined to a plug 65 which closes the forward end of brake cylinder 60 and is secured to a stationary buffer plate 66 by means, as bolts 67. Spear 64 has a central bore 68 opening through its aft end and connected to some convenient drain at its forward end as through plug 65 and buffer plate 66. An annular water jacket 69 is provided in spear 64 to which a conduit 70 from a source of water pressure (not shown) is connected. At the aft end of the spear, a ring of peripherally spaced apertures 71 are provided in the outer wall defining water jacket 69 in order that water from conduit 70 may enter the annular chamber 72 between spear 64 and brake cylinder 60. The apertures 71, as seen in section, are slanted forward at about forty-five degrees from vertical. They have a suitable spacing and size which will permit water issuing from them to form a water annulus which acts as a closure at the aft end of the brake cylinder. The formation of the water annulus (Fig. 3) will cause the brake cylinder to fill. Overflow drains through cut-outs 14 in the forward end of power cylinder 10.

The spear 64 is frusto-conical with the base directed forward into plug 65. Its smallest outer diameter, at the apertures, is substantially less than the inner diameter of choke ring 58 which is less than that of the brake sleeve bore 27; it increases gradually to the line B (Fig. 1). From there to its base, it is substantially equal to the inner diameter of the choke ring.

Figure 4:
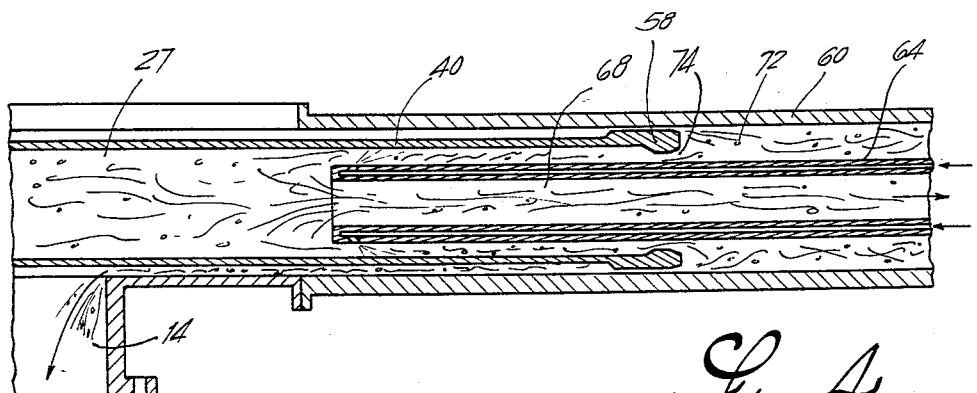
Fig. 4 is another schematic view showing the piston in the process of being braked with arrows indicating the flow of water.
Figure 2:
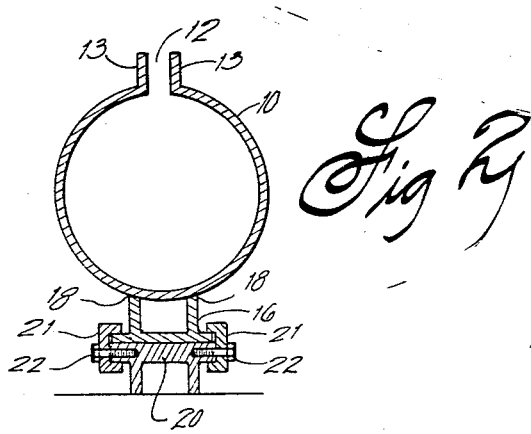
Fig. 2 is a cross-sectional view taken on line 2—2 of Fig. 1.

In operation, water from conduit 70 issues through apertures 71 and fills annular chamber 72 as shown in Fig. 3. At the end of the power run of piston 24, brake sleeve 40 connected therewith enters brake cylinder 60. The water in annular chamber 72 has only the annular orifice 74 (Fig. 4) between the inner surface of choke ring 58 and the outer surface of spear 64 for escape. It fills the bore 27 of brake sleeve 40 and is forced to drain through the spear's central bore 68. The water which gets passed the brake sleeve 40 drains through cut-outs 14. As the brake sleeve 40 continues forward, annular orifice 74 further diminishes until it is practically eliminated at the line B (Fig. 1). The pressure of the water at the forward end of choke ring 58 builds up and effectively brings the brake sleeve 40, hence piston 24, to a halt. The force of the braking is absorbed by the buffer plate 66.

It is of course understood that various modifications may be made in the structure above described without departing in any way from the spirit of the invention as defined in the appended claims.

What is claimed is:

1. An energy absorbing device for stopping a piston reciprocably mounted in a power cylinder comprising a brake sleeve joined to the forward end of said piston and adapted to move therewith, a brake cylinder secured at one end to said power cylinder as an extension thereof, a plug closing the other end of said brake cylinder, a spear concentrically disposed in said brake cylinder and supported at one end by said plug, said spear defining an annular chamber with the inner wall of said brake cylinder adapted to receive said brake sleeve, a jacket concentrically disposed around said spear defining a closed annular water chamber, means connected to said water jacket for filling it with water, said jacket being provided with a ring of apertures at the other end of said spear whereby fluid issuing therefrom forms an annulus and said brake cylinder may be filled with water, said spear having a central bore opened in the other end thereof and connected to drain so that liquid displaced by said brake sleeve from said brake cylinder is ejected through said bore.

2. The device of claim 1 including cut outs in said cylinder for draining overflow and said fluid is water.

3. A water brake for an aircraft catapult having a piston reciprocably mounted in a power cylinder comprising a hollow barrel secured at one end to the forward end of said piston, a hollow adapter secured at one end to the other end of said barrel, the other end of said adaptor being ball-like, a hollow brake sleeve having a socket at one end seated on said ball-like other end of said adapter, a brake cylinder secured to said power cylinder as a forward extension thereof, a plug closing the forward end of said brake cylinder, a spear disposed concentrically in said brake cylinder and supported at one end by said plug, said spear defining an annular chamber with the inner wall of said brake cylinder, said spear having means in its aft end adapted to be connected to a source of water pressure whereby an annulus of water may be formed at the aft end of said brake cylinder and said annular chamber filled with water, said spear having a central bore opening into said brake cylinder and connected to drain, said sleeve being adapted to enter said annular chamber and displace water therefrom through said central bore.

4. The device of claim 3 wherein the forward end of said brake sleeve is provided with a choke ring, said spear being tapered in an aft direction, and the outer end of said choke ring is substantially equal to the inner diameter of said brake cylinder and its inner diameter is substantially that of the spear at its one end.

References Cited in the file of this patent

UNITED STATES PATENTS

| 845,827 | Steedman | Mar. 5, 1907 |
| 2,293,167 | Overbeke | Aug. 18, 1942 |